United States Patent
Coggin et al.

(10) Patent No.: US 12,177,207 B2
(45) Date of Patent: Dec. 24, 2024

(54) TECHNIQUES FOR VERIFYING USER INTENT AND SECURELY CONFIGURING COMPUTING DEVICES

(71) Applicant: Apple Inc., Cupertino, CA (US)

(72) Inventors: Jay S. Coggin, Mountain View, CA (US); Daniel C. Klingler, Mountain View, CA (US); Kyle C. Brogle, San Francisco, CA (US); Johannes P. Schmidt, Los Altos Hills, CA (US); Eric A. Allamanche, Sunnyvale, CA (US); Thomas Alsina, Saratoga, CA (US); Bob Bradley, San Jose, CA (US); Alex T. Nelson, Portland, OR (US); Rudolph Van Der Merwe, Portland, OR (US); Joseph M. Triscari, West Linn, OR (US); Keun Sup Lee, Sunnyvale, CA (US); Pedro Mari, Santa Cruz, CA (US); Aaron M. Elder, Los Gatos, CA (US); Richard M. Powell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 17/356,487

(22) Filed: Jun. 23, 2021

(65) Prior Publication Data
US 2021/0392129 A1  Dec. 16, 2021

Related U.S. Application Data

(63) Continuation of application No. 16/579,712, filed on Sep. 23, 2019, now Pat. No. 11,050,737, which is a
(Continued)

(51) Int. Cl.
*H04L 9/40* (2022.01)
*G06F 21/00* (2013.01)
(Continued)

(52) U.S. Cl.
CPC ............ *H04L 63/083* (2013.01); *G06F 21/00* (2013.01); *G06F 21/45* (2013.01); *H04L 63/18* (2013.01); *H04W 12/06* (2013.01); *H04W 12/50* (2021.01)

(58) Field of Classification Search
CPC ...... H04L 63/083; H04L 63/18; H04W 12/06; H04W 12/003; G06F 21/00
See application file for complete search history.

(56) References Cited

U.S. PATENT DOCUMENTS 8,521,086 B2    8/2013  Bradley
10,231,128 B1*  3/2019  Ziraknejad ............ H04W 12/08
(Continued)

FOREIGN PATENT DOCUMENTS

CN    103402275 A    11/2013
CN    203289542 U    11/2013
(Continued)

OTHER PUBLICATIONS

Chinese Patent Application No. 201880032074.X—Second Office Action dated Aug. 3, 2022.
(Continued)

*Primary Examiner* — Olugbenga O Idowu
(74) *Attorney, Agent, or Firm* — DICKINSON WRIGHT RLLP

(57) ABSTRACT

The embodiments set forth a technique for enabling a computing device to securely configure a peripheral computing device. According to some embodiments, the method can include the steps of (1) approving a request received from the peripheral computing device to engage in a setup procedure for the peripheral computing device, (2) receiving, from the peripheral computing device: (i) an audio signal that encodes a password and timing information, and (ii) a light signal. Additionally, the method can involve, in
(Continued)

240 – The Computing Device 102-2 Receives (1) The Audio Signal, And (2) The Light Signal. Upon Verifying The Correspondence Between The Timing Information And The Light Signal, The Computing Device 102-2 Decodes The Password.

response to identifying that the timing information correlates with the light signal: (3) extracting the password from the audio signal, and (4) establishing a communication link with the peripheral computing device based on the password. In turn, the method can involve (5) providing configuration information to the peripheral computing device over the communication link.

20 Claims, 9 Drawing Sheets

Related U.S. Application Data continuation of application No. 15/721,301, filed on Sep. 29, 2017, now Pat. No. 10,432,614.

(60) Provisional application No. 62/556,359, filed on Sep. 9, 2017, provisional application No. 62/507,150, filed on May 16, 2017.

(51) Int. Cl.
*G06F 21/45* (2013.01)
*H04W 12/06* (2021.01)
*H04W 12/50* (2021.01)

(56) References Cited

U.S. PATENT DOCUMENTS

| | | | |
|---|---|---|---|
| 2003/0149874 A1 | 8/2003 | Balfanz et al. | |
| 2004/0236748 A1* | 11/2004 | Coltrera | G16H 10/20 707/999.009 |
| 2011/0053558 A1 | 3/2011 | Teague | |
| 2012/0178369 A1 | 7/2012 | Kim | |
| 2012/0221859 A1 | 8/2012 | Marien | |
| 2013/0272164 A1 | 10/2013 | Leonardos et al. | |
| 2014/0056172 A1* | 2/2014 | Lee | H04B 10/116 370/254 |
| 2014/0113592 A1 | 4/2014 | Wu et al. | |
| 2014/0281547 A1 | 9/2014 | Modzelewski et al. | |
| 2014/0310525 A1* | 10/2014 | Kohlenberg | H04L 63/18 713/171 |
| 2014/0349608 A1 | 11/2014 | Li | |
| 2014/0364056 A1 | 12/2014 | Belk et al. | |
| 2014/0380419 A1* | 12/2014 | Peluso | H04W 12/50 726/3 |
| 2015/0016305 A1* | 1/2015 | Douer | H04W 48/16 370/254 |
| 2015/0029880 A1 | 1/2015 | Burns et al. | |
| 2015/0089607 A1 | 3/2015 | Hubner et al. | |
| 2015/0089613 A1 | 3/2015 | Tippett et al. | |
| 2016/0007144 A1 | 1/2016 | Huang et al. | |
| 2016/0088064 A1 | 3/2016 | Chen et al. | |
| 2016/0150066 A1 | 5/2016 | Yae | |
| 2017/0324559 A1* | 11/2017 | Hu | H04W 12/50 |
| 2018/0167149 A1 | 6/2018 | Stilwell et al. | |
| 2018/0247151 A1* | 8/2018 | Talyansky | G06F 16/5866 |
| 2018/0337911 A1 | 11/2018 | Coggin et al. | |
| 2018/0367944 A1* | 12/2018 | Heo | G06F 1/163 |

FOREIGN PATENT DOCUMENTS

| | | |
|---|---|---|
| CN | 103793261 A | 5/2014 |
| CN | 105117637 A | 12/2015 |
| CN | 204965434 U | 1/2016 |
| CN | 105408766 A | 3/2016 |
| CN | 106060772 A | 10/2016 |
| TW | 201416907 A | 5/2014 |

OTHER PUBLICATIONS

Chinese Patent Application No. 201880032074.X—First Office Action dated Dec. 2, 2021.
PCT Patent Application No. PCT/US2018/015163—International Search Report and Written Opinion dated May 10, 2018.
European Patent Application No. 18802943.3—Extended European Search Report dated Nov. 13, 2020.
European Patent Application No. 22195945.5—Extended European Search Report dated Dec. 2, 2022.

* cited by examiner

210 – A New Peripheral Computing Device 102-1 Powers On, Enters Into A Setup Mode, And Advertises The Setup Mode To Nearby Computing Devices 102.

220 – One Of The Nearby Computing Devices 102 (e.g., 102-2) Identifies The Peripheral Computing Device 102-1, And Engages In The Setup Mode To Configure The Peripheral Computing Device 102-1.

230 – The Peripheral Computing Device 102-1 Produces (1) An Audio Signal That Encodes A Password / Timing Information, And (2) A Light Signal That Corresponds To The Timing Information.

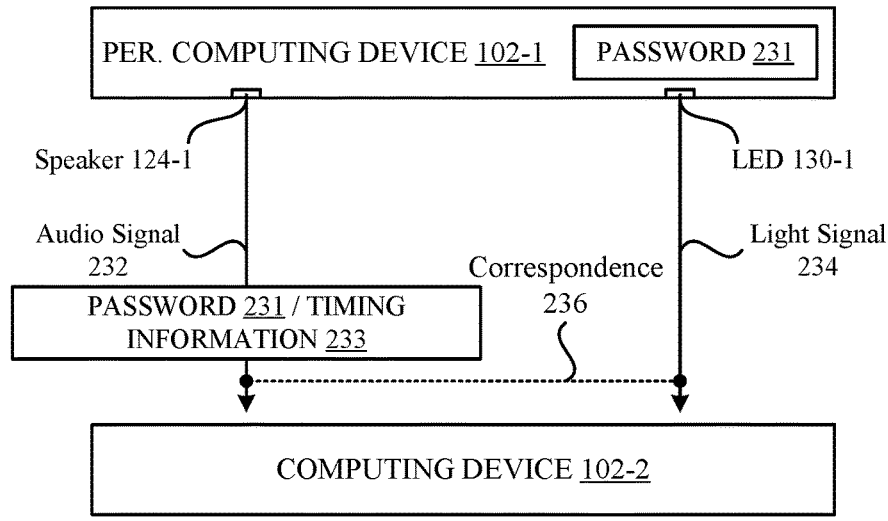

*FIG. 2C*

240 – The Computing Device 102-2 Receives (1) The Audio Signal, And (2) The Light Signal. Upon Verifying The Correspondence Between The Timing Information And The Light Signal, The Computing Device 102-2 Decodes The Password.

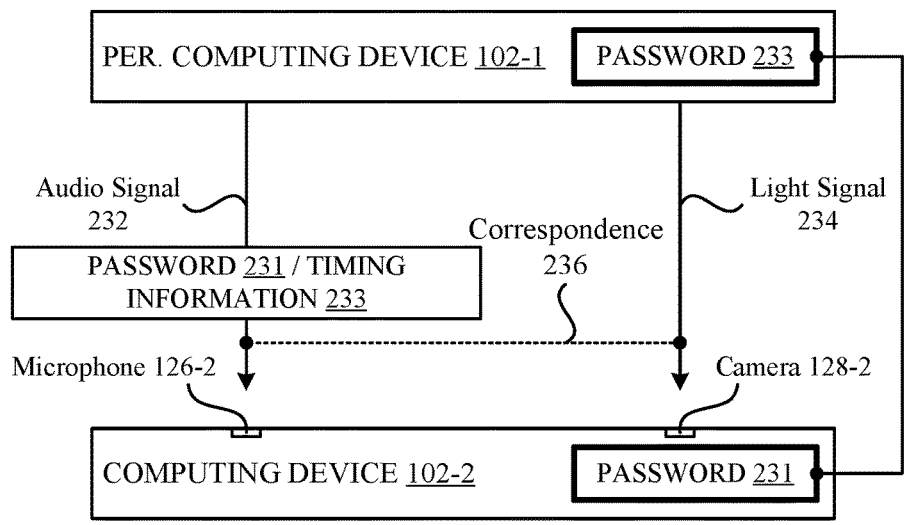

*FIG. 2D*

250 – The Peripheral Computing Device 102-1 And The Computing Device 102-2 Establish A Secure Communication Link Based On The Password.

260 – The Computing Device 102-2 Provides Configuration Information To The Peripheral Computing Device 102-1 For Installation.

270 – The Peripheral Computing Device 102-1 Installs The Configuration Information And Enters Into An Operable Mode. The Computing Device 102-2 Can Remain Connected To Or Disconnect From The Peripheral Computing Device 102-1.

TECHNIQUES FOR VERIFYING USER INTENT AND SECURELY CONFIGURING COMPUTING DEVICES

CROSS-REFERENCE TO RELATED APPLICATIONS

The present application is a continuation of U.S. patent application Ser. No. 16/579,712 entitled "TECHNIQUES FOR VERIFYING USER INTENT AND SECURELY CONFIGURING COMPUTING DEVICES," filed Sep. 23, 2019, set to issue Jun. 29, 2021 as U.S. patent Ser. No. 11/050,737, which is a continuation of U.S. patent application Ser. No. 15/721,301, entitled "TECHNIQUES FOR VERIFYING USER INTENT AND SECURELY CONFIGURING COMPUTING DEVICES," filed Sep. 29, 2017, issued Oct. 1, 2019 as U.S. Pat. No. 10,432,614, which claims the benefit of U.S. Provisional Application No. 62/507,150, entitled "TECHNIQUES FOR VERIFYING USER INTENT AND SECURELY CONFIGURING COMPUTING DEVICES," filed May 16, 2017 and U.S. Provisional Application No. 62/556,359, entitled "TECHNIQUES FOR VERIFYING USER INTENT AND SECURELY CONFIGURING COMPUTING DEVICES," filed Sep. 9, 2017, the contents of which are incorporated by reference in their entirety.

The present application is also related to U.S. patent application Ser. No. 13/913,172, entitled "CONTROLLING A MEDIA DEVICE USING A MOBILE DEVICE," filed Jun. 7, 2013, which is published as U.S. Publication No. 2014/0364056A1 on Dec. 11, 2014, now U.S. Pat. No. 9,979,438 issued May 22, 2018, which claims the benefit of U.S. Provisional Patent Application No. 62/507,202, entitled "METHODS AND INTERFACES FOR HOME MEDIA CONTROL," filed May 16, 2017, U.S. Provisional Patent Application No. 62/507,208, entitled "METHODS AND INTERFACES FOR HOME MEDIA CONTROL," filed May 16, 2017, and U.S. Provisional Patent Application No. 62/514,932, entitled "METHODS AND INTERFACES FOR HOME MEDIA CONTROL," filed Jun. 4, 2017.

FIELD

The described embodiments relate generally to computing devices that are configured to communicate with and configure one another. More particularly, the described embodiments involve verifying a user's intent to engage his or her computing device when a nearby peripheral computing device is requesting assistance to perform a setup procedure.

BACKGROUND

Recent years have shown a proliferation in the average number and types of peripheral computing devices that are owned by individuals. For example, it is common for an individual to own a wearable device (e.g., fitness tracker), a pair of headphones, a set-top-box, a wireless speaker, and so on. Notably, owning these peripheral computing devices can deliver a rich user experience as each device can provide specialized functionality to meet a given user's needs throughout the day. However, many of these peripheral computing devices lack user interfaces (e.g., speakers, wearable devices, etc.) that enable a user to efficiently establish complex configurations (e.g., WiFi passwords, user account information, etc.) for the devices, e.g., when they require an "out-of-the-box" setup process. In some cases, a more advanced computing device (e.g., a smartphone, a tablet, etc.) can be utilized to pair with the peripheral computing device and assist the peripheral computing device through the setup process. Unfortunately, this approach is prone to security issues that have yet to be addressed. For example, nearby malicious computing devices can be capable of mimicking peripheral computing devices and trick users into pairing with/sending sensitive information to the malicious computing devices. Consequently, there is a need for a more secure and reliable approach to enable computing devices to participate in peripheral computing device setup procedures.

SUMMARY

To cure the foregoing deficiencies, the representative embodiments set forth herein disclose various techniques for a reliable approach to verify a user's intent to engage his or her computing device when a nearby peripheral computing device is requesting assistance to perform a setup procedure.

According to some embodiments, a method is disclosed for enabling a computing device to securely configure a peripheral computing device. According to some embodiments, the method can include the steps of (1) approving a request received from the peripheral computing device to engage in a setup procedure for the peripheral computing device, (2) receiving, from the peripheral computing device: (i) an audio signal that encodes a password and timing information, and (ii) a light signal. Additionally, the method can involve, in response to identifying that the timing information correlates with the light signal: (3) extracting the password from the audio signal, and (4) establishing a communication link with the peripheral computing device based on the password. In turn, the method can involve (5) providing configuration information to the peripheral computing device over the communication link.

According to some embodiments, another method is disclosed for enabling a peripheral computing device to conduct a setup procedure. According to some embodiments, the method can include the steps of (1) receiving an approval from a computing device of the nearby computing devices to engage in the setup procedure, (2) issuing, to the computing device: (i) an audio signal that encodes a password and timing information, and (ii) a light signal that correlates with the timing information. Additionally, the method can involve, in response to verifying that the computing device is in possession of the password: (3) establishing a communication link with the computing device based on the password. In turn, the method can additionally involve (4) installing configuration information received from the computing device over the communication link.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2G illustrate conceptual diagrams of an example scenario in which a peripheral computing device seeks assistance from a nearby computing device to carry out a setup/configuration procedure, according to some embodiments.

DETAILED DESCRIPTION

Figure 1:
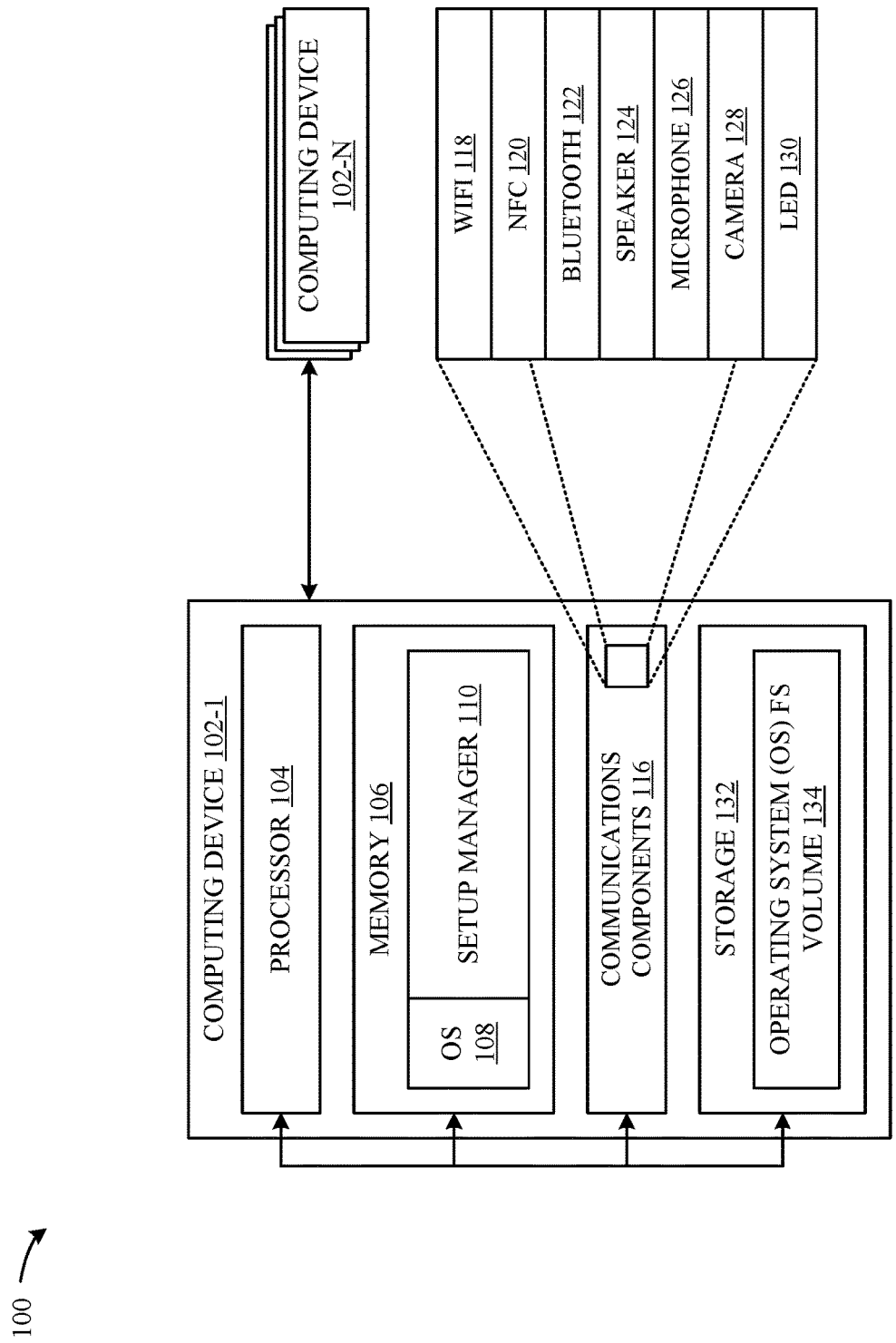
FIG. 1 illustrates a block diagram of different computing devices that can be configured to implement different aspects of the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for reliably verifying a user's intent to pair his or her computing device with a peripheral computing device (e.g., a computing device having minimal user interface components (e.g., a set-top box, a speaker, a pair of wireless headphones, a fitness tracker, wearable, etc.)). The user's intent, for example, can correspond to an acceptance to engage with a particular peripheral computing device in some manner, e.g., to configure the peripheral computing device for operation when the peripheral computing device is operating in a setup mode. According to some embodiments, the peripheral computing device can enter into the setup mode when appropriate, e.g., when first powered-on "out-of-the-box," when configuration information on the peripheral computing device is corrupted or lost, and so on. According to some embodiments, the peripheral computing device can, under the setup mode, periodically broadcast setup requests (e.g., via Bluetooth) to nearby computing devices that are configured to listen for the setup requests and respond to them. For example, when one of the nearby computing devices detects the setup request, the computing device can display a user interface (UI) notification that indicates (i.e., to a user of the computing device) that the peripheral computing device is operating in the setup mode and requires assistance. In turn, the computing device can indicate (e.g., upon receiving an approval from the user) that the computing device will engage with the peripheral computing device to help carry out a setup process.

Upon receipt of the approval, the peripheral computing device can encode a password into at least one audio signal that (1) is produced (e.g., using one or more speakers) by the peripheral computing device, and (2) is specifically targeted for receipt by nearby devices. Additionally, timing information (e.g., timestamps) can be encoded into the audio signal, where the timing information correlates with at least one light signal that is also produced (e.g., using one or more light sources) by the peripheral computing device in conjunction with the audio signal. In this manner, the intention of the user to engage with the peripheral computing device can be reliably verified, as the user will need to position the computing device relative to the peripheral computing device in a specific manner to enable the computing device to effectively process and verify the audio and light signals. In particular, the computing device should be positioned relative to the peripheral computing device such that the computing device can effectively (1) detect the audio signal (e.g., via a microphone), and (2) detect the light signal (e.g., via a camera, a sensor, etc.). In turn, the computing device can verify that the light signal correlates with the timing information included in the audio signal, thereby establishing a reliable confidence that the user is intending for the computing device to pair with the peripheral computing device. In other words, when the computing device receives the audio signal (e.g., from a malicious peripheral computing device), but is not able to verify the light signal (or vice versa), the computing device can abandon the pairing process.

Next, the computing device and the peripheral computing device can establish a secure communication link (e.g., using the encoded password included in the audio signal) over which the setup process can be performed. For example, the encoded password can be decoded and used at least as a basis for establishing one or more symmetrical keys that are shared by the computing device and the peripheral computing device and used to establish the secure communication link. In turn, the computing device can provide, to the peripheral computing device, various configuration information possessed by the computing device, e.g., WiFi information (e.g., Service Set Identifiers (SSIDs)/passwords/encryption keys), user account information (e.g., cloud account logins/passwords/encryption keys), encryption key sets, user preferences (e.g., languages, locales, configuration settings, etc.), and so on. In turn, the peripheral computing device can absorb the configuration information and reconfigure itself as appropriate, and exit the setup mode upon verifying that a desired level of operation (e.g., an internet connection, account access, etc.) is achieved. Subsequently, the computing device and the peripheral computing device can remain paired with one another to perform additional functionalities (e.g., the computing device can stream music to the peripheral computing device). Alternatively, the computing device and the peripheral computing device can disconnect and go their separate ways.

A more detailed discussion of these techniques is set forth below and described in conjunction with FIGS. 1, 2A-2G, and 3-6, which illustrate detailed diagrams of systems and methods that can be used to implement these techniques.

FIG. 1 illustrates a block diagram 100 of different computing devices 102 that can be configured to implement various aspects of the techniques described herein, according to some embodiments. Specifically, FIG. 1 illustrates a high-level overview of a computing device 102, which, as shown, can include at least one processor 104, at least one memory 106, and at least one storage 132. According to some embodiments, the processor 104 can be configured to work in conjunction with the memory 106 and the storage 132 to enable the computing device 102 to implement the various techniques set forth in this disclosure. According to some embodiments, the storage 132 can represent a storage entity that is accessible to the computing device 102, e.g., a hard disk drive, a solid-state drive, a mass storage device, a remote storage device, a storage service, and the like. For example, the storage 132 can be configured to store an operating system (OS) file system volume 134 that can be mounted at the computing device 102, where the operating system (OS) file system volume 134 includes an OS 108 that is compatible with the computing device 102.

According to some embodiments, and as shown in FIG. 1, the OS 108 can enable a setup manager 110 to execute on the computing device 102. It will be understood that the OS 108 can also enable a variety of other processes to execute on the computing device 102, e.g., OS daemons, native OS applications, user applications, and the like. According to some embodiments, the setup manager 110 on a computing device 102 can be configured to interface with another setup manager 110 on a peripheral computing device 102 to perform the techniques described herein. According to some embodiments, the setup manager 110 on the computing device 102 can function as a "configurator" for the setup manager 110 on the peripheral computing device 102, e.g., when the setup manager 110 on the peripheral computing device 102 broadcasts a setup request to nearby computing devices 102, and the setup manager 110 on the computing device 102 accepts the setup request. In turn, and subsequent to carrying out the secure pairing techniques described herein, the setup manager 110 (on the computing device 102) can access different information associated with the computing device 102 and transmit the information to the setup manager 110 (on the peripheral computing device 102) for installation at the peripheral computing device 102. The information can include, for example, WiFi information (e.g., Service Set Identifiers (SSIDs)/passwords/encryption keys), user account information (e.g., cloud account logins/passwords/encryption keys), encryption key sets, and so on, that enables the peripheral computing device 102 to provide a rich user experience. It is noted that the foregoing examples are not meant to represent an exhaustive list in any manner, and that any form of information can be shared between the computing devices 102 as appropriate.

Additionally, although not illustrated in FIG. 1, the setup manager 110 of a given computing device 102 can be configured to manage paired device information that enables the setup manager 110 to identify related computing devices 102 with which the computing device 102 has previously paired. For example, the paired device information can include, for each other computing device 102 with which the computing device 102 previously paired, a unique identifier (ID) associated with the computing device 102, one or more encryption keys associated with the computing device 102, and so on. In this manner, the computing device 102 can readily establish secure communication links with those other computing devices 102 (e.g., using the encryption keys), and perform desirable functionalities (e.g., issuing configuration updates, sharing content, etc.).

As shown in FIG. 1, and as described in greater detail herein, the OS 108 can be configured to enable the setup manager 110 to interface with a variety of communications components 116 that are included in/accessible to the computing device 102. The communications components 116 can include, for example, a WiFi interface 118, a Near Field Communication (NFC) interface 120, a Bluetooth interface 122, at least one speaker 124, at least one microphone 126, at least one camera interface 128, and at least one light source (e.g., light emitting diodes (LEDs), lasers, etc.)—illustrated in FIG. 1 as LED 130. The communications components 116 can further include components not illustrated in FIG. 1, e.g., a cellular interface, an Ethernet interface, display interfaces, input interfaces (e.g., buttons, touch surfaces, dials, etc.), and so on. It is noted that these examples are not meant to represent an exhaustive list in any manner, and that any form of communication interface can be included in the communications components 116. For example, the communications components 116 can include Global Positioning System (GPS) interfaces that can enable the computing devices 102 to identify when they are in proximity to one another. This can provide, for example, an additional level of security with respect to identifying when users are intending to utilize their computing devices 102 to engage in the setup procedures described herein with other computing devices 102.

As noted above, a setup manager 110-2/computing device 102-2 can function as a configurator for a setup manager 110-1/peripheral computing device 102-1, e.g., when the setup manager 110-1 broadcasts a setup request to nearby computing devices 102, and the setup manager 110-2/computing device 102-2 accepts the setup request. In turn, the setup manager 110-1 (on the peripheral computing device 102-1) can establish a password (e.g., a random password, a password derived on pre-existing information, etc.), and encode the password into an audio signal that is produced by way of the speaker 124-1 included in the peripheral computing device 102-1. Additionally, the setup manager 110-1 can encode timing information (e.g., timestamps) into the audio signal that correlate with a light signal that is produced by way of the LED 130-1. For example, the setup manager 110-1 can cause the LED 130 to emit light according to a pre-defined pattern, a randomly-generated pattern, etc., and generate timing information that correlates with the emitted light. Alternatively, the setup manager 110-1 can generate timing information according to the aforementioned patterns, and cause the LED 130-1 to emit light in accordance with the timing information.

In any case, the setup manager 110-2 (i.e., the configurator/computing device 102-2) can indicate (e.g., to a user via a user interface) to place the computing device 102-2 in proximity to the peripheral computing device 102-1, and point the camera 128-2 of the computing device 102-2 toward the peripheral computing device 102-1. At this time, the setup manager 110-2 can obtain, via the microphone 126-2/speaker 124-2, the audio signal/light signal, respectively, produced by peripheral computing device 102-1. In turn, the setup manager 110-2 can analyze the timing information included in the audio signal relative to the light signal, and extract the encoded password upon verifying that the timing information correlates with the light signal (e.g., within a threshold degree of accuracy). Finally, the computing device 102-2 and the peripheral computing device 102-1 can establish a secure communication link (e.g., using the password) over which the setup process can be performed, as described herein.

Accordingly, FIG. 1 sets forth a high-level overview of the different components/entities that can be included in each computing device 102 to enable the embodiments described herein to be properly implemented. As described in greater detail below, these components/entities can be utilized to verify a user's intent to engage his or her computing device when a nearby peripheral computing device is requesting assistance to perform a setup procedure, thereby enhancing overall security.

Figure 2A:
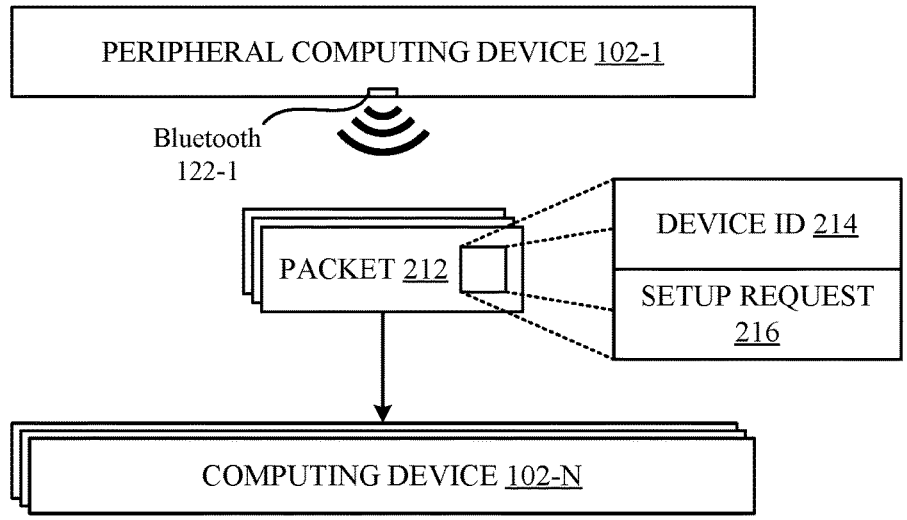

FIGS. 2A-2G illustrate conceptual diagrams of an example scenario in which a new (e.g., "out-of-the-box") peripheral computing device 102-1 seeks assistance from a nearby computing device 102-2 to carry out a setup/configuration procedure, according to some embodiments. However, it is noted that the techniques described in conjunction with FIGS. 2A-2G are not limited only to setting up new peripheral computing devices. On the contrary, these techniques can also be applied to existing peripheral computing devices, e.g., when seeking to reconfigure peripheral computing devices, establish new pairings with nearby computing devices, and so on. As shown in FIG. 2A, a first step 210 can involve the peripheral computing device 102-1 powering-on (e.g., for a first time), and loading the setup manager 110-1 to cause the peripheral computing device 102-1 to (1) enter into a setup mode, and (2) advertise the setup mode to nearby computing devices 102. According to some embodiments, the setup mode can be advertised through packets 212 that are issued by way of the Bluetooth interface 122-1, the NFC interface 120-1, etc., included in the peripheral computing device 102-1. As shown in FIG. 2A, each packet 212 can include (1) a device identifier (ID) 214 (e.g., a hardware/software identifier) associated with the peripheral computing device 102-1, and (2) an indication 216 of a setup request (e.g., a pre-defined code, message, etc.). In this manner, the nearby computing devices 102 can listen (e.g., using their respective Bluetooth interfaces 122, NFC interfaces 120, etc.) for setup mode advertisements from other nearby computing devices 102, e.g., the peripheral computing device 102-1, and respond when appropriate. It is noted that the nearby computing devices 102 can be configured to listen at different times to promote energy efficiency. For example, each of the computing devices 102 can be configured to listen after a threshold window of time elapses beyond an unlock event, as it is unlikely the computing device 102 will engage the setup procedures described herein within the aforementioned window of time. In another example, each of the computing devices 102 can be configured to listen after a user launches an application that is associated with the setup procedure, e.g., a configuration application available on the computing device 102.

Figure 2B:
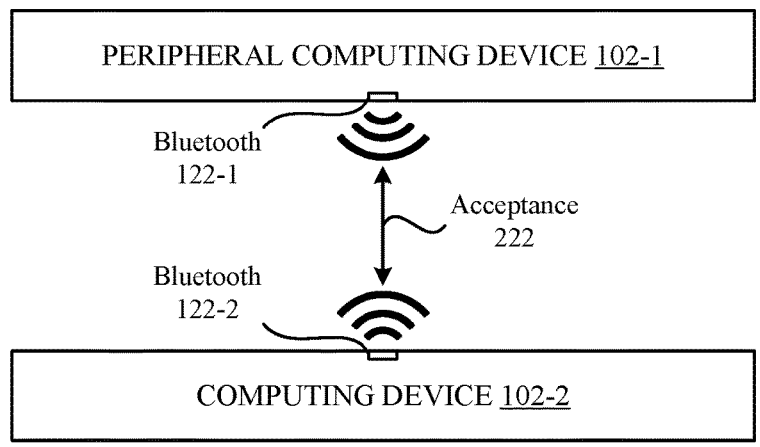

For example, as shown in FIG. 2B, a step 220 can involve the computing device 102-2 detecting the packets 212 issued by the peripheral computing device 102-1, and receiving an approval (e.g., from a user via a user interface) after prompting whether to engage with the peripheral computing device 102-1. In turn, the setup manager 110-2 can cause the computing device 102-2 to engage in the setup mode (e.g., via an acceptance packet 222) to configure the peripheral computing device 102-1. It is noted that additional steps can be taken to improve the overall robustness of the pairing techniques described herein. For example, in conjunction with the computing device 102-2 engaging the setup mode, the peripheral computing device 102-1 can begin producing audio/light signals that enable the computing device 102-2 to tune its hardware components (e.g., microphone(s) 126, camera(s) 128, other sensors, etc.) to effectively receive and process the audio/light signals. For example, a sensitivity of the microphone 126 can be actively tuned in accordance with a decibel level of the audio signal (as received by the computing device 102-2) to ensure that low volume deficiency/high volume distortion does not adversely impact the ability of the computing device 102-2 to effectively process the audio signal. In another example, various properties associated with the camera 128 (e.g., exposure levels, white balance, color balance, etc.) can be adjusted in accordance with the light signal (as received by the computing device 102-2) to ensure that the light signal is properly received and processed.

Next, at step 230 in FIG. 2C, the peripheral computing device 102-1 can produce (1) an audio signal that encodes (i) a password 231, and (ii) timing information 233, and (2) a light signal that correlates to the timing information. In particular, the peripheral computing device 102-1 can utilize the speaker 124-1 to produce an audio signal 232 (in which the password 231/timing information 233 are encoded), and can utilize the LED 130-1 to produce a light signal 234 that corresponds to the timing information 233 (as indicated by the correlation 236 in FIG. 2C).

Next, at step 240 in FIG. 2D, the computing device 102-2 receives (1) the audio signal 232, and (2) the light signal 234. In particular, the computing device 102-2 can receive the audio signal 232 by way of the microphone 126-2, and can receive the light signal 234 by way of the camera 128-2 (or another sensor) included in the computing device 102-2. In turn, the computing device 102-2 can attempt to verify the correlation 236 between the timing information 233 (included in the audio signal 232) and the light signal 234. According to some embodiments, the computing device 102-2 can verify the correlation 236 even when a slight drift is observed between the timing information and the light signal 234, but remains within a threshold level of tolerance. In any case, when the computing device 102-2 verifies the correlation 236, the computing device 102-2 can decode the encoded password 231 and retain the password 231 to establish a secure communication link (as described in further detail below). In contrast, when the computing device 102-2 cannot verify the correlation 236, the computing device 102-2 can prompt a user to reposition the computing device 102-2 to ensure that (1) the computing device 102-2 is in proximity to the peripheral computing device 102-1, (2) the camera 128-2 is pointed at the peripheral computing device 102-1, and so on.

Additionally, although not illustrated in FIG. 2D, the computing device 102-2 can also be configured to obtain images (e.g., via the camera 128-2, other sensors (e.g., depth-based sensors, infrared sensors, etc.), and so on) of the peripheral computing device 102-1 and perform image recognition techniques in attempt to identify whether the peripheral computing device 102-1 is an authentic device/is the device with which the user intends to engage. For example, the computing device 102-2 can maintain (or have access to) product images/schematics that are indexed in accordance with the device IDs 214 (described above in conjunction with FIG. 2A). In this manner, the computing device 102-2 can identify the type/look of the peripheral computing device 102-1 (based on its corresponding device ID 214 received at step 210), and process the images obtained via the camera 128-2 to effectively identify when a malicious device is attempting to pose as the peripheral computing device 102-1.

Figure 2E:
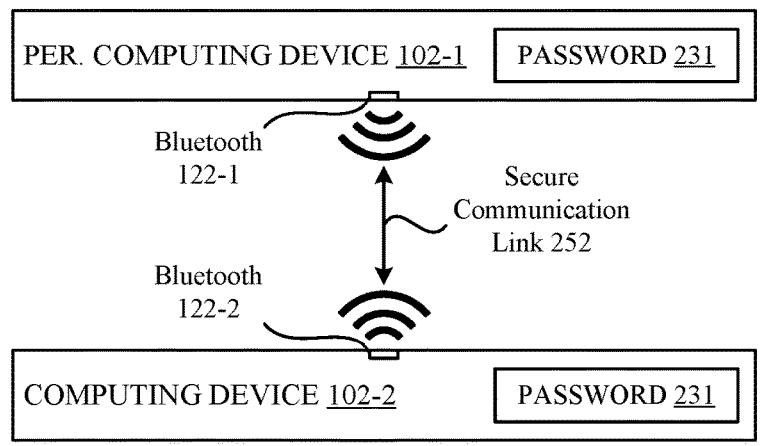

Next, at step 250 in FIG. 2E, the peripheral computing device 102-1 and the computing device 102-2 can establish a secure communication link 252. According to some embodiments, the secure communication link 252 can be established using respective Bluetooth interfaces 122, and can be based on the password 231. For example, the password 231 can function as a symmetric encryption key that can be used to form the secure communication link 252 (and to protect the various packets that are sent through the secure communication link). In another example, the password 231 can provide a basis for establishing at least one encryption key that can be used to form the secure communication link.

For example, each of the peripheral computing device 102-1 and the computing device 102-2 can access a cryptographic algorithm that processes the password 231 to derive at least one symmetric key through which the secure communication link 252 is ultimately established. In this manner, even if a malicious party in some way gains access to the password 231 during the pairing process, they unlikely will be able to derive the at least one symmetric key through which the secure communication link 252 is ultimately established.

Figure 2F:
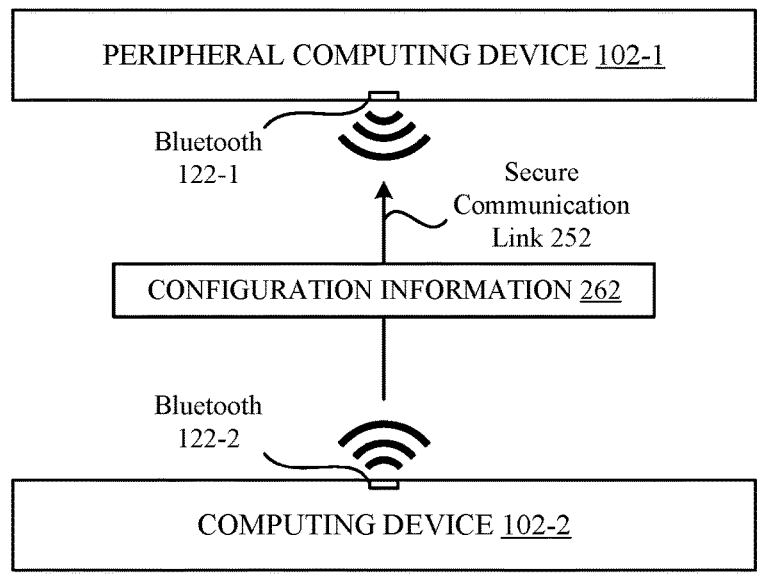

In any case, at step 260 in FIG. 2F—after the secure communication link 252 is established—the computing device 102-2 can provide configuration information 262 to the peripheral computing device 102-1 for installation. Again, the configuration information 262 can include, for example, WiFi information (e.g., Service Set Identifiers (SSIDs)/passwords/encryption keys), user account information (e.g., cloud account logins/passwords/encryption keys), encryption key sets, and so on, that enables the peripheral computing device 102-1 to provide a rich user experience. In turn, the peripheral computing device 102-1 can process the configuration information 262 as appropriate. For example, the peripheral computing device 102-1 can utilize WiFi information included in the configuration information 262 to connect to a corresponding WiFi network. In another example, the peripheral computing device 102-1 can utilize user account information included in the configuration information 262 to access data/services provided by a cloud service. In yet another example, the peripheral computing device 102-1 can utilize encryption key sets to enter into circles of trust with other computing devices 102 and provide various functionalities. It is noted that the foregoing examples are merely exemplary, and that any form of information can be included in the configuration information 262—and, further, that the peripheral computing device 102-1 can process the configuration information 262 in any appropriate manner that enables the peripheral computing device 102-1 to employ various functionalities.

Figure 2G:
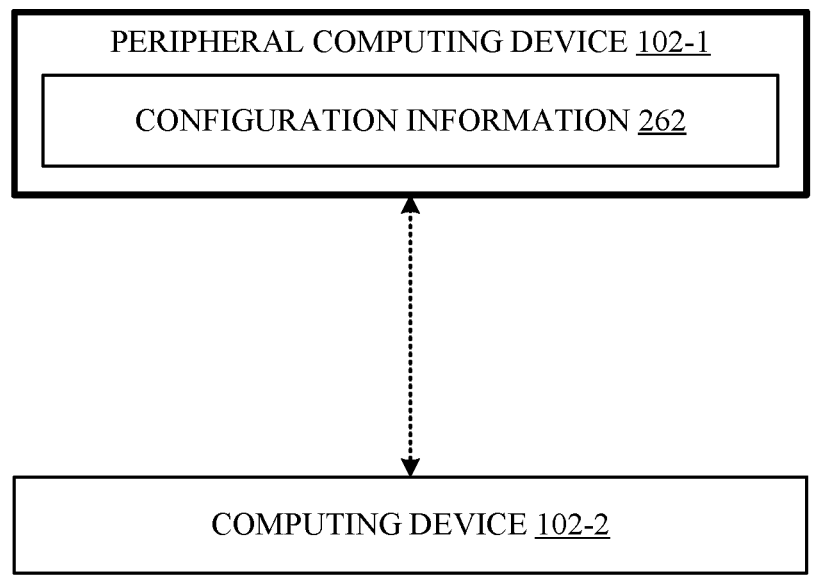

Finally, at step 270 in FIG. 2G, the peripheral computing device 102-1 can install the configuration information 262 and enters into an operable mode (e.g., after being initially set up, repaired, reconfigured, etc.). For example, the peripheral computing device 102-1 can employ functionalities that the peripheral computing device 102-1 is intended for, e.g., playing music that is streamed over the WiFi connection, acting as a speakerphone for telephone calls, gathering data through various sensors, and so on. At this juncture, the peripheral computing device 102-1 and the computing device 102-2 can optionally remain in communication with one another over the secure communication link 252. For example, the computing device 102-2 can stream music (e.g., stored on or accessible to the computing device 102-2) to the peripheral computing device 102-1 for playback through the speaker 124-1 included on the peripheral computing device 102-1. Alternatively, one or more of the peripheral computing device 102-1 and the computing device 102-2 can eliminate the secure communication link 252 and go their separate ways.

Accordingly, FIGS. 2A-2G set forth conceptual diagrams of an example scenario in which the peripheral computing device 102-1 receives assistance from the computing device 102-2 to perform a setup process at the peripheral computing device 102-1. Next, FIGS. 3-5—which are described below in greater detail—provide additional high-level breakdowns of the techniques described herein.

Figure 3:
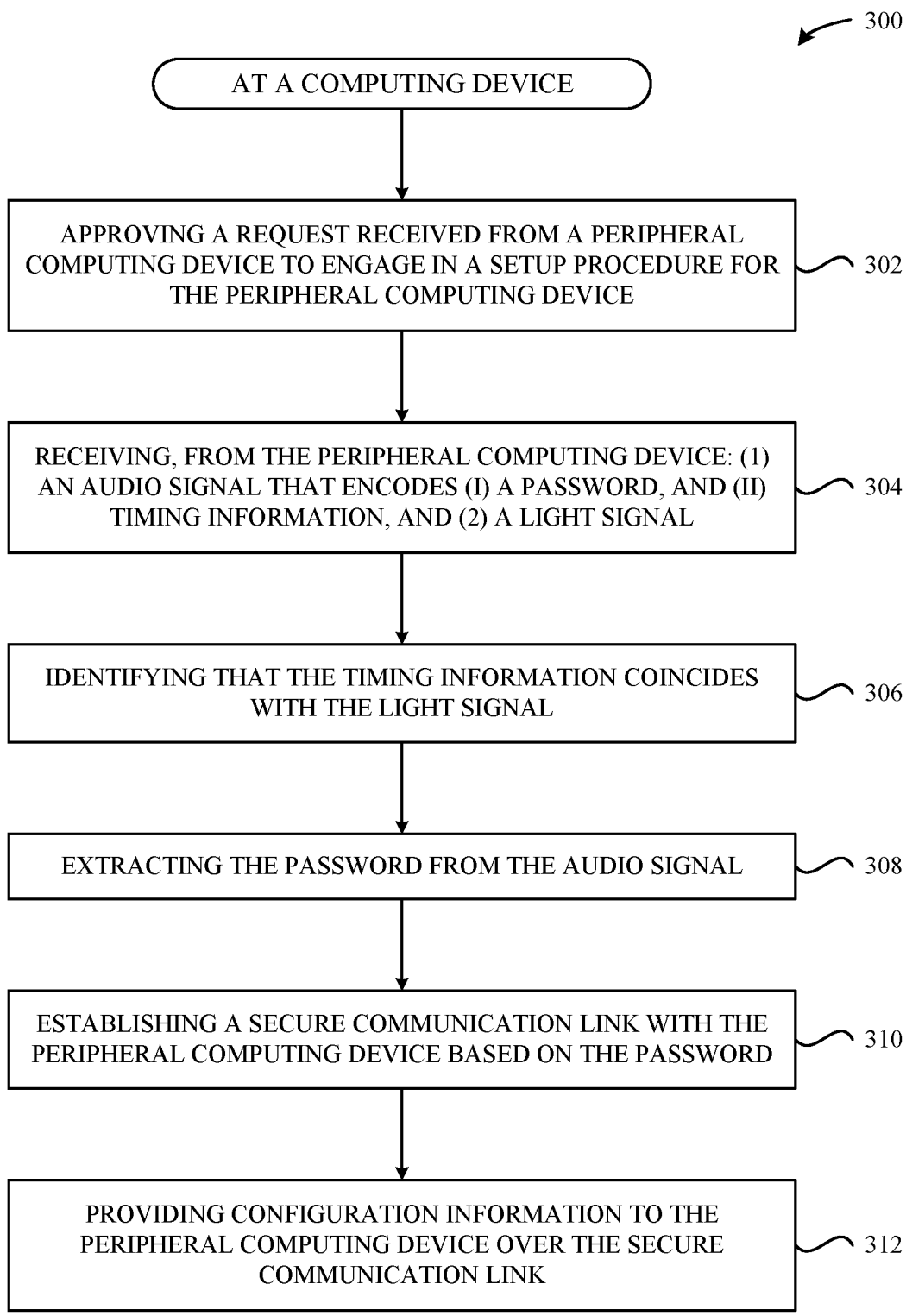
FIG. 3 illustrates a method for enabling a computing device to securely configure a peripheral computing device, according to some embodiments.

FIG. 3 illustrates a method 300 for enabling a computing device 102 (e.g., a computing device 102-1) to securely configure a peripheral computing device 102 (e.g., a peripheral computing device 102-2), according to some embodiments. As shown, the method 300 begins at step 302, where the computing device 102-1 approves a request received from a peripheral computing device 102-2 to engage in a setup procedure for the peripheral computing device 102-2 (e.g., as described above in conjunction with FIGS. 2A-2B). At step 304, the computing device 102-1 receives, from the peripheral computing device 102-2: (1) an audio signal that encodes a password and timing information (e.g., timestamps), and (2) a light signal (e.g., as described above in conjunction with FIGS. 2C-2D). At step 306, the computing device 102-1 identifies that the timing information correlates with the light signal (e.g., as described above in conjunction with FIG. 2D). At step 308, the computing device 102-1 extracts the password from the audio signal (e.g., as described above in conjunction with FIG. 2D). At step 310, the computing device 102-1 establishes a secure communication link with the peripheral computing device 102-2 based on the password (e.g., as described above in conjunction with FIG. 2E). At step 312, the computing device 102-1 provides configuration information to the peripheral computing device 102-2 over the secure communication link (e.g., as described above in conjunction with FIG. 2F).

According to some embodiments, the peripheral computing device 102-1 can be configured to perform various checks when installing the configuration information to ensure that the peripheral computing device 102-1 functions properly. In this manner, when problems arise (e.g., WiFi connectivity issues, account login issues, etc.), the peripheral computing device 102-1 can notify the computing device 102-2. In turn, the computing device 102-2 can prompt a user to re-enter information, select different configurations, and so on, to cure the issues at hand.

Accordingly, the foregoing steps described above in conjunction with FIG. 3 set forth a technique for (1) establishing a secure connection between the peripheral computing device 102-1 and the computing device 102-2, and (2) performing at least an initial configuration of the peripheral computing device 102-1. It is noted that additional steps can be implemented in association with the foregoing techniques to enable extended functionalities of the peripheral computing device 102-1 to be configured and utilized.

Consider, for example, a scenario in which the peripheral computing device 102-1 is an audio component that is configured to playback audio from a variety of sources (e.g., music services, paired devices, etc.). In this scenario, the method 300 can further involve prompting the user (of the computing device 102-2) for login information associated with music services with which the user is registered. Additionally, the computing device 102-2 can provide trial offers for different online services that are available and relevant to the computing device 102-2/peripheral computing device 102-1—especially when the user is unable to provide the aforementioned logins for music services. For example, the computing device 102-2 can identify a type of the peripheral computing device 102-1, and, in turn, interface with an online service to identify any free trials that are available in association with purchasing the peripheral computing device 102-1.

In some cases, the computing device 102-2 can be designed to participate as a component within a smart home environment. In this scenario, the computing device 102-2 can prompt the user about different smart home configuration settings that should be applied to the peripheral computing device 102-1. For example, the computing device 102-2 can be configured to (1) present at least one home (e.g., "Cupertino Home") that was previously set up by the user, (2) present the option to create (i.e., establish) at least one home when no homes have been set up by the user, and so on. In any case, when the user selects a home, the computing device 102-2 can be configured to (1) present at least one room (e.g., "Living Room") that was previously set up by the user, (2) present the option to create (i.e., establish) at least one room when no rooms have been set up (e.g., within the selected home) by the user, and so on. It is noted that the foregoing examples are exemplary, and that any smart home properties can be assigned to the peripheral computing device 102-1 during the configuration procedures described herein. For example, the peripheral computing device 102-1 can be configured to participate as an individual speaker within a particular group of speakers (e.g., belonging to a house and/or room). In another example, the peripheral computing device 102-1 can be configured to function as one of two speakers in a stereo configuration, or one of many speakers in a surround sound configuration. In yet another example, the speaker can be configured to function as a single speaker that typically roams throughout a particular home.

Accordingly, FIG. 3 sets forth a method for enabling a computing device 102 to engage in a secure and enhanced configuration procedure with a peripheral computing device 102. Beneficially, the configuration procedures provided herein can range from simple scenarios (e.g., sharing WiFi information) to more complex scenarios (e.g., smart home configurations). In any case, the computing devices 102 described herein can be configured to provide user interfaces that guide users through the various setup procedures that are associated with peripheral computing devices 102. In turn, the peripheral computing devices 102 can be configured to interface with and provide various levels of feedback (e.g., operability indications, confirmation indications, etc.), the details of which are described below in conjunction with FIG. 4.

Figure 4:
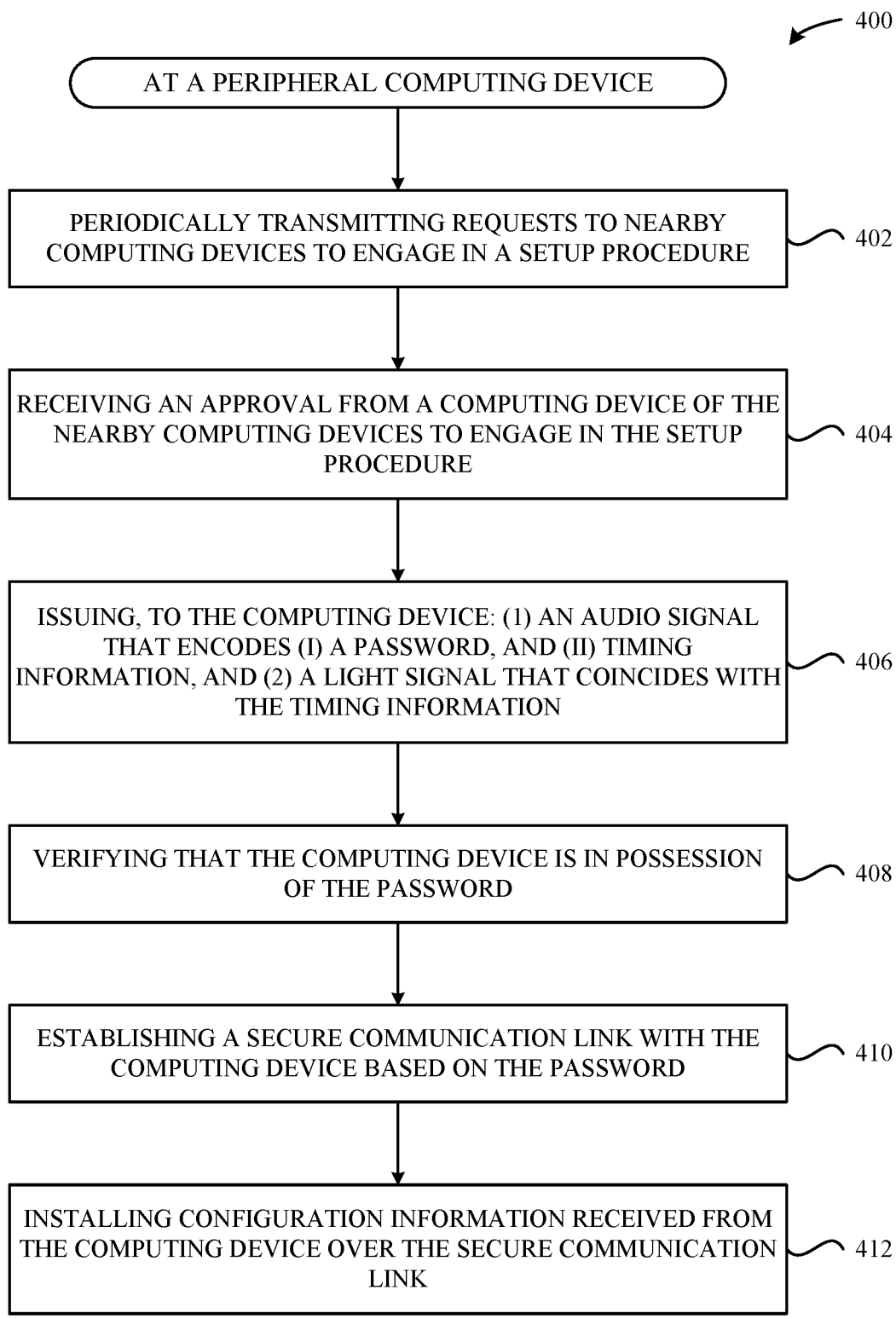
FIG. 4 illustrates a method for conducting a setup procedure at a peripheral computing device, according to some embodiments.

FIG. 4 illustrates a method 400 for conducting a setup procedure at a peripheral computing device 102 (e.g., a peripheral computing device 102-1), according to some embodiments. As shown, the method 400 begins at step 402, where the peripheral computing device 102-1 periodically transmits requests to nearby computing devices 102 to engage in the setup procedure (e.g., as described above in conjunction with FIG. 2A). At step 404, the peripheral computing device 102-1 receives an approval from a computing device 102 (e.g., a computing device 102-2) of the nearby computing devices 102 to engage in the setup procedure (e.g., as described above in conjunction with FIG. 2B). At step 406, the peripheral computing device 102-1 issues, to the computing device 102-2: (1) an audio signal that encodes a password and timing information (e.g., timestamps), and (2) a light signal that correlates with the timing information (e.g., as described above in conjunction with FIG. 2C). At step 408, the peripheral computing device 102-1 verifies that the computing device 102-2 is in possession of the password (e.g., as described above in conjunction with FIG. 2D). For example, the computing device 102-2 can indicate to the peripheral computing device 102-1 that the password as successfully received. At step 410, the peripheral computing device 102-1 establishes a secure communication link with the computing device 102-2 based on the password (e.g., as described above in conjunction with FIG. 2E). At step 412, the peripheral computing device 102-1 installs configuration information received from the computing device 102-2 over the secure communication link (e.g., as described above in conjunction with FIG. 2F).

Figure 5:
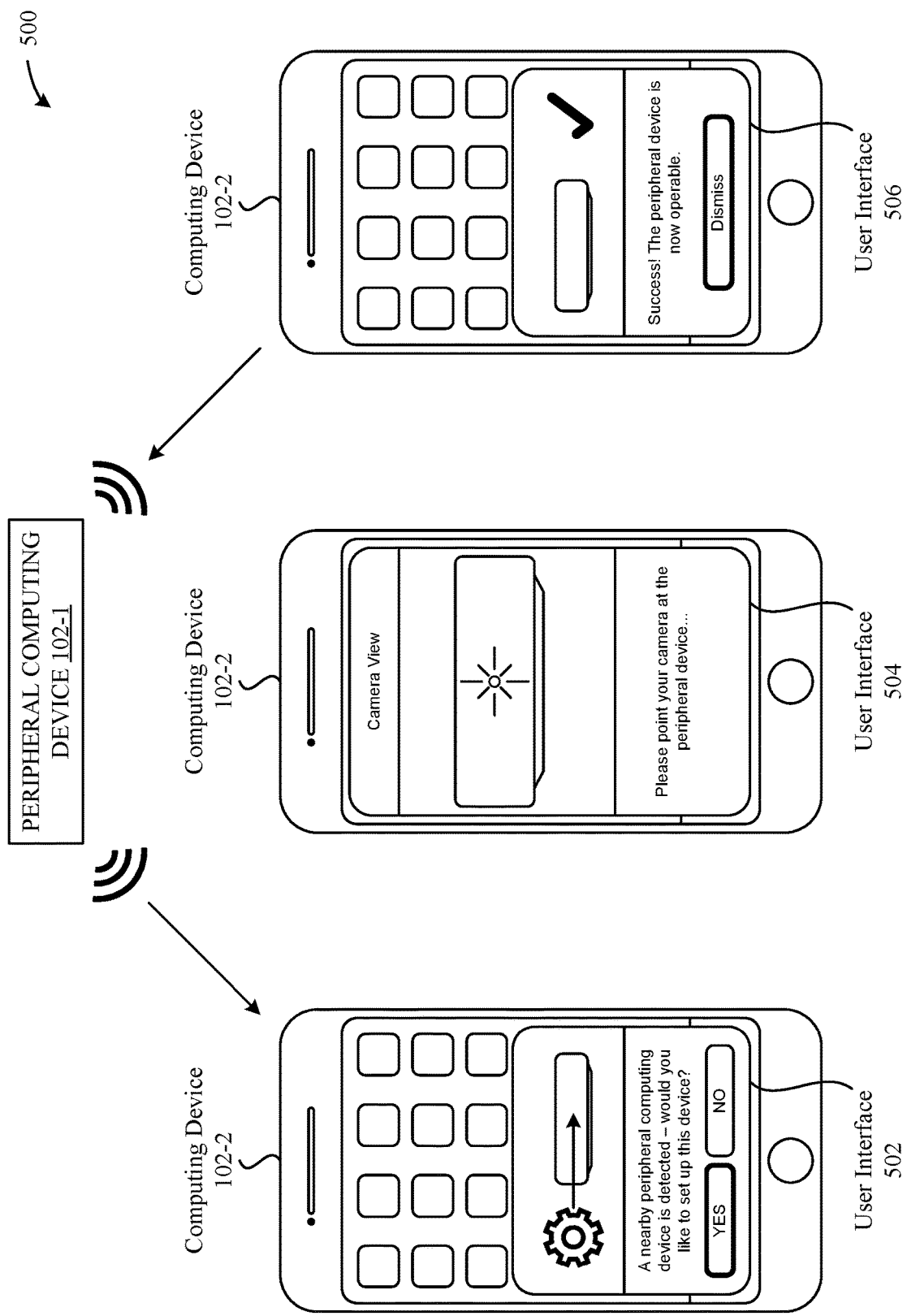
FIG. 5 illustrates a conceptual diagram of example user interfaces that can be implemented at a computing device that participates in a setup/configuration process of a peripheral computing device, according to some embodiments.

Additionally, FIG. 5 illustrates a conceptual diagram 500 of example user interfaces that can be implemented at a computing device (e.g., the computing device 102-2) that participates in a setup/configuration process of a peripheral computing device 102 (e.g., the peripheral computing device 102-1), according to some embodiments. As shown in FIG. 5, the computing device 102-2—specifically, a setup manager 110-2 executing on the computing device 102-2—can detect that the peripheral computing device 102-1 has entered into a setup mode and is requesting assistance from nearby computing devices 102 (e.g., as described above in conjunction with FIG. 2A). In turn, the computing device 102-2 can display a user interface 502 that notifies a user of the computing device 102-2 about the setup request being issued by peripheral computing device 102-1. For example, the user interface 502 can include images, animations, sounds, etc., that draw attention to the computing device 102-2 and prompt the user as to whether he or she would like to utilize the computing device 102-2 to pair with/set up the peripheral computing device 102-1. As shown in FIG. 5, the user interface 502 can include a visual representation of the peripheral computing device 102-1, e.g., based on a device ID that is transmitted by the peripheral computing device 102-1 (e.g., as described above in conjunction with FIG. 2A). Additionally, as shown in the user interface 502 (and in accordance with the examiner scenario illustrated in FIG. 5), the user accepts the prompt, which causes the computing device 102-2 to display the user interface 504. Moreover, the user's acceptance of the prompt causes the computing device 102-2 to indicate an acceptance to the peripheral computing device 102-1, which then can begin producing the audio/light signals described herein.

As shown in FIG. 5, the user interface 504 can direct the user to point the camera 128-2 (on the computing device 102-2) at the peripheral computing device 102-1. Notably, this naturally causes the user to place the computing device 102-2 within proximity to the peripheral computing device 102-1, thereby enabling the computing device 102-2 to detect the audio signals (e.g., through the microphone 126-2 on the computing device 102-2) produced by the peripheral computing device 102-1. Additionally, this enables the computing device 102-2 to detect the light signals produced by the peripheral computing device 102-1 to be received at the computing device 102-2 (e.g., through the camera 128-2 on the computing device 102-2, and/or some other sensor). At this point, the computing device 102-2 can process the audio/light signals, and, upon verifying the timing information to light signal correlations described herein, move along in the process with a reliable degree of confidence that the user truly intends to cause the computing device 102-2 to pair with the peripheral computing device 102-1.

In turn, and as described herein, the computing device 102-2 can (1) extract the password encoded in the audio signals, (2) utilize the password to establish a secure communication link with the peripheral computing device 102-1, and (3) provide configuration information to the peripheral computing device 102-1 for installation. Although not illustrated in FIG. 5, it is noted that additional user interfaces can be displayed at the computing device 102-2/peripheral computing device 102-1 to assist the user when carrying out the setup procedure of the peripheral computing device 102-1. For example, the user interface can take the form of a wizard-like flow in which the user is walked through various options that can be applied during the setup process, and where the peripheral computing device 102-1 issues different notifications (e.g., sounds, light flashes, etc.) to confirm the progress. For example, the user can select different configuration information that he or she wishes to provide to the peripheral computing device 102-1 (e.g., WiFi information, but not personal user account information). The user can also select different configuration settings to assign to the peripheral computing device 102-1, e.g., default volumes, active/inactive features, and so on. In any case, at the conclusion of the setup procedure, the computing device 102-2 can display an indication within a user interface 506 that the peripheral computing device 102-1 has been properly configured (e.g., in accordance with the user's instructions). At that point, the computing device 102-2 and the peripheral computing device 102-1 can remain connected (as described herein) to perform additional functionalities, or go their separate ways (as also described herein).

Accordingly, FIG. 5 illustrates the manner in which the embodiments described herein can provide a highly effective and efficient approach for verifying a user's intent to engage his or her computing device when a nearby peripheral computing device is requesting assistance to perform a setup procedure.

In sum, the embodiments set forth herein can enable a computing device to (1) establish a secure communication channel with a peripheral computing device, and (2) configure the peripheral computing device for operation. Although the embodiments set forth herein primarily involve producing (1) an audio signal in which (i) a password/(ii) timing information are encoded, and (2) a light signal that coincides with the timing information, it is noted that other approaches can be utilized while achieving the same or similar benefits. For example, an inverse approach can be utilized in which password/timing information are encoded into the light signal, and in which the audio signal coincides with the timing information. In another example, an approach can be used in which at least a first portion of a password is transmitted using an audio signal and at least a second portion of the password is transmitted using a light signal. This example can further be extended by including additional portions of the password in additional signals. In yet another example, at least one encryption key can be encoded into the audio signal, and an encrypted password can be encoded into the light signal, where the at least one encryption key can be utilized to decrypt the encrypted password (or vice versa). In any case, these various approaches can provide the same benefit of verifying a user's intent to pair his or her computing device with a peripheral computing device.

Additionally, it is noted that the embodiments set forth herein can be modified to employ different approaches to achieve the same or similar results without departing from the scope of this disclosure. For example, the light signals can be omitted from the setup/configuration process described herein such that only audio signals are required. In particular, the computing device 102-2 can be configured to disregard any light signals produced by the peripheral computing device 102-1 when extracting password information included in the audio signals, thereby providing a more simplified approach. It is noted that any encoding scheme can be utilized to include the password information within the audio signals without departing from the scope of this disclosure.

Alternatively, the audio signals can be omitted from the setup/configuration process described herein such that only light signals are required. For example, the peripheral computing device 102-1 can be configured to encode password information into light signals that are intended to be received by the computing device 102-2. In this approach, the light signals can employ any encoding scheme (e.g., Manchester encoding) to effectively communicate the password information. In turn, the computing device 102-2 can obtain the light signals and extract the password information from the light signals in accordance with the encoding scheme that is utilized. According to some embodiments, an initial handshake can be performed between the peripheral computing device 102-1 and the computing device 102-2, whereupon an indication of the encoding scheme to be utilized is communicated. In this regard, the encoding scheme can be dynamically changed to help increase security and thwart malicious activities.

Additionally, it is noted that various approaches can be used to produce the coinciding audio/light signals described herein. In particular, it is noted that the audio signal can include timing information that coincides with any aspects of the light signal. For example, when two or more light sources are included on the peripheral computing device 102-1, each light source can emit a light signal in accordance with timing information that is included in the audio signal. In another example, the timing information can coincide with a spatial pattern of the light signals produced by the peripheral computing device 102-1. In yet another example, the timing information can coincide with the frequencies, intensities, etc., associated with the light signals. It is noted that the foregoing examples are not in any way meant to represent an exhaustive list of the different approaches that can be used. Additionally, it is noted that the techniques associated with these examples can be combined/modified in any manner without departing from the scope of this disclosure.

Additionally, it is noted that the light signals described herein can encompass any form of a visual pattern animation that is displayed on a display device. For example, the peripheral computing device 102-1 can include a display device (e.g., an integrated liquid crystal display (LCD) screen, an organic light emitting diode (OLED) screen, etc.)—or communicate with an external display device (e.g., a television)—that is capable of displaying an animation into which information can be encoded. For example, when audio signals are employed (and encode password information), the animation can coincide with timing information included in the audio signal. In another example, when audio signals are not employed—or when they do not play an integral role in the pairing process—the animation itself can encode password information. In any case, the computing device 102-1 can be configured to obtain and process the animations (alone or in combination with the audio signals) to effectively perform the pairing techniques described herein. Again, is noted that the foregoing examples are not in any way meant to represent an exhaustive list of the different approaches that can be used. Additionally, it is noted that the techniques associated with these examples can be combined/modified in any manner without departing from the scope of this disclosure.

Additionally, it is noted that the techniques described herein can include an out-of-band verification of the authenticity of the peripheral computing device 102-1. This can involve, for example, the computing device 102-1 facilitating communications between the peripheral computing device 102-1 and a server device (e.g., managed by a manufacturer of the peripheral computing device 102-1 or a partner of the manufacturer) to enable the server device/computing device 102-2 to confirm that the peripheral computing device 102-1 is authentic. For example, the server device can issue encryption-based challenges to the peripheral computing device 102-1 that presumably can only be correctly answered by the peripheral computing device 102-1. Moreover, the peripheral computing device 102-1 can provide identifier information, encryption key information, etc., as an indication of the authenticity of the peripheral computing device 102-1. In turn, the server device can indicate to the computing device 102-2 as to whether the pairing process should be carried out, thereby substantially enhancing security. Additionally, it is noted that the peripheral computing device 102-1 can employ similar techniques to verify the authenticity of the computing device 102-2 to reduce the likelihood of engaging in a malicious pairing. For example, the peripheral computing device 102-1 can issue challenges (e.g., as described above) to the computing device 102-2 to verify authenticity. Moreover, if an internet connection is available to the peripheral computing device 102-1, the peripheral computing device 102-1 can communicate with the server device to perform additional levels of verification of the computing device 102-2.

Figure 6:
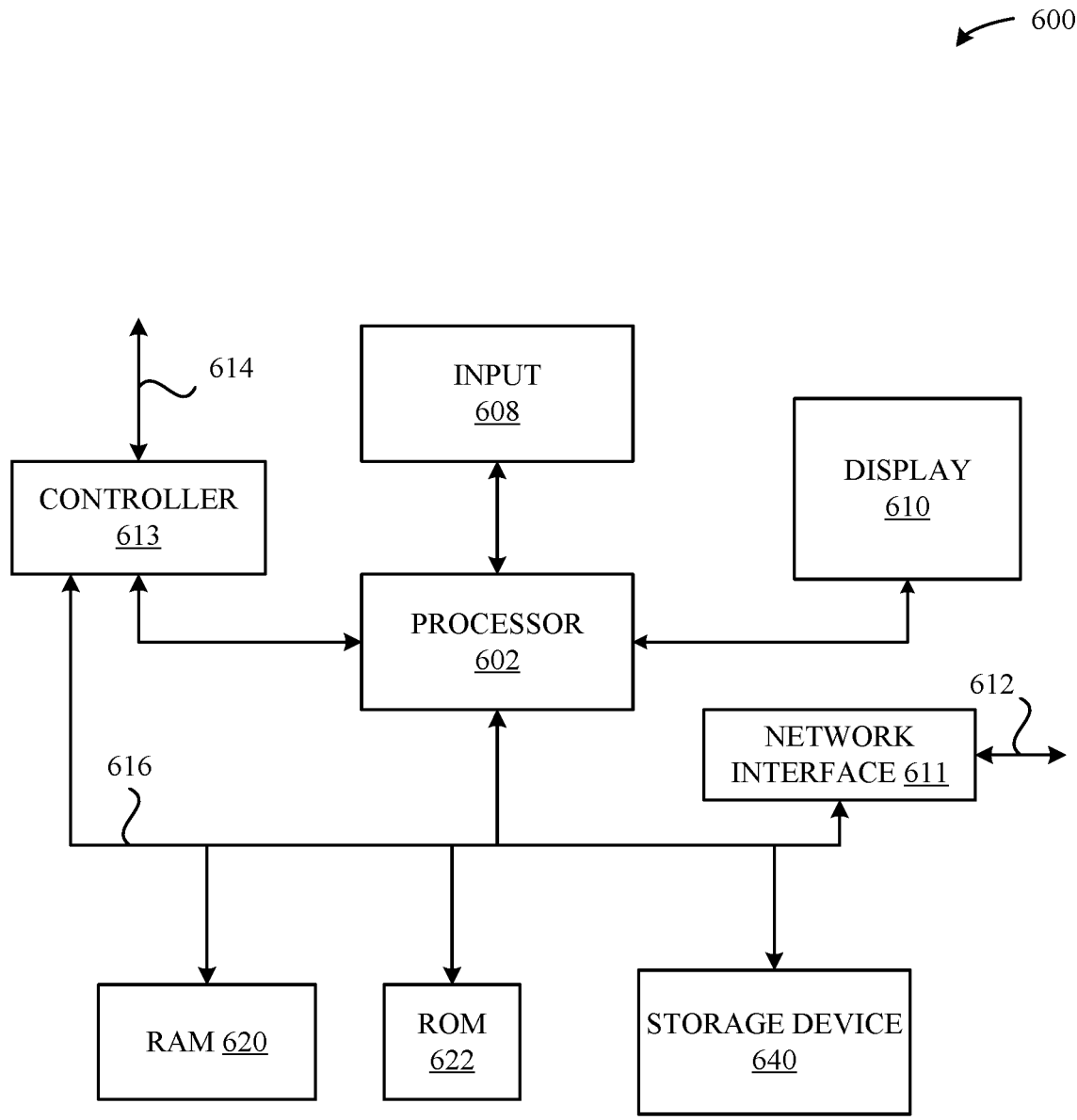
FIG. 6 illustrates a detailed view of a computing device that can represent the computing devices of FIG. 1 used to implement the various techniques described herein, according to some embodiments.

FIG. 6 illustrates a detailed view of a computing device 600 that can represent the computing devices of FIG. 1 used to implement the various techniques described herein, according to some embodiments. For example, the detailed view illustrates various components that can be included in the computing devices 102 described in conjunction with FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 (e.g., via a graphics component) to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the storage device 640, which can comprise a single disk or a collection of disks (e.g., hard drives). In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, comprising, by at a first device:
    establishing a communication link with a second device by:
        approving a request received from the second device to establish the communication link with the second device;
        receiving, from the second device:
            (1) a first signal that encodes an encryption key, and
            (2) a second signal that encodes encrypted data, wherein the first and second signals are transmitted through different transmission mediums;
        using the encryption key:
            decrypting the encrypted data to produce decrypted data; and
        using the decrypted data:
            forming the communication link with the second device.

2. The method of claim 1, further comprising, prior to receiving the first and second signals from the second device:
    displaying a notification that indicates the second device is requesting to undergo a setup procedure, wherein the notification includes an option to accept the request or ignore the request; and
    in response to receiving a selection of the option to accept the request:
        indicating an approval of the request to the second device.

3. The method of claim 2, wherein the notification comprises an image of the second device, a description of the second device, instructional information associated with the setup procedure, an animation, a video, a sound, or some combination thereof.

4. The method of claim 2, wherein the request and the approval are transmitted using WiFi, Bluetooth, or NFC protocols.

5. The method of claim 1, further comprising:
    providing configuration information to the second device over the communication link, wherein the configuration information comprises WiFi network credentials, user account credentials, encryption key sets, or some combination thereof.

6. The method of claim 1, wherein:
    the first signal is transmitted using audio signals and the second signal is transmitted using light signals; or
    the first signal is transmitted using light signals and the second signal is transmitted using audio signals.

7. The method of claim 6, wherein:
the audio signals are produced by at least one speaker included on the second device, and the audio signals are received at the first device using at least one microphone included on the first device; and
the light signals are produced by at least one light source included on the second device, and the light signals are received at the first device using at least one camera on the first device.

8. A non-transitory computer readable storage medium configured to store instructions that, when executed by at least one processor included in a first device, cause the first device to establish a communication link with a second device, by carrying out steps that include:
approving a request received from the second device to establish the communication link with the second device;
receiving, from the second device:
(1) a first signal that encodes an encryption key, and
(2) a second signal that encodes encrypted data, wherein the first and second signals are transmitted through different transmission mediums;
using the encryption key:
decrypting the encrypted data to produce decrypted data; and
using the decrypted data:
forming the communication link with the second device.

9. The non-transitory computer readable storage medium of claim 8, wherein the steps further include, prior to receiving the first and second signals from the second device:
displaying a notification that indicates the second device is requesting to undergo a setup procedure, wherein the notification includes an option to accept the request or ignore the request; and
in response to receiving a selection of the option to accept the request:
indicating an approval of the request to the second device.

10. The non-transitory computer readable storage medium of claim 9, wherein the notification comprises an image of the second device, a description of the second device, instructional information associated with the setup procedure, an animation, a video, a sound, or some combination thereof.

11. The non-transitory computer readable storage medium of claim 9, wherein the request and the approval are transmitted using WiFi, Bluetooth, or NFC protocols.

12. The non-transitory computer readable storage medium of claim 8, wherein the steps further include:
providing configuration information to the second device over the communication link, wherein the configuration information comprises WiFi network credentials, user account credentials, encryption key sets, or some combination thereof.

13. The non-transitory computer readable storage medium of claim 8, wherein:
the first signal is transmitted using audio signals and the second signal is transmitted using light signals; or
the first signal is transmitted using light signals and the second signal is transmitted using audio signals.

14. The non-transitory computer readable storage medium of claim 13, wherein:
the audio signals are produced by at least one speaker included on the second device, and the audio signals are received at the first device using at least one microphone included on the first device; and
the light signals are produced by at least one light source included on the second device, and the light signals are received at the first device using at least one camera on the first device.

15. A second device configured to establish a communication link with a first device, the second device comprising:
at least one processor; and
at least one memory storing instructions that, when executed by the at least one processor, cause the second device to carry out steps that include:
providing a request to the first device to establish the communication link with the first device;
generating an encryption key;
encrypting data using the encryption key to generate encrypted data;
providing, to the first device:
(1) a first signal that encodes the encryption key, and
(2) a second signal that encodes the encrypted data, wherein the first and second signals are transmitted through different transmission mediums; and
forming the communication link with the first device using the data.

16. The second device of claim 15, wherein the first and/or second signals cause the first device to:
display a notification that indicates the second device is requesting to undergo a setup procedure, wherein the notification includes an option to accept the request or ignore the request; and
in response to receiving a selection of the option to accept the request:
indicate an approval of the request to the second device.

17. The second device of claim 16, wherein the notification comprises an image of the second device, a description of the second device, instructional information associated with the setup procedure, an animation, a video, a sound, or some combination thereof.

18. The second device of claim 16, wherein the request and the approval are transmitted using WiFi, Bluetooth, or NFC protocols.

19. The second device of claim 15, wherein the steps further include:
receiving configuration information from the first device over the communication link, wherein the configuration information comprises WiFi network credentials, user account credentials, encryption key sets, or some combination thereof.

20. The second device of claim 15, wherein:
the first signal is transmitted using audio signals and the second signal is transmitted using light signals; or
the first signal is transmitted using light signals and the second signal is transmitted using audio signals.

* * * * *